(12) United States Patent
Camoriano Gladson et al.

(10) Patent No.: US 8,410,916 B1
(45) Date of Patent: Apr. 2, 2013

(54) REFRESHABLE TACTILE MAPPING DEVICE

(76) Inventors: Nina Alessandra Camoriano Gladson, Newport, NC (US); Guillermo Camoriano, Louisville, KY (US)

( * ) Notice: Subject to any disclaimer, the term of this patent is extended or adjusted under 35 U.S.C. 154(b) by 409 days.

(21) Appl. No.: 12/943,150

(22) Filed: Nov. 10, 2010

Related U.S. Application Data

(60) Provisional application No. 61/260,124, filed on Nov. 11, 2009.

(51) Int. Cl.
*H04B 3/36* (2006.01)

(52) U.S. Cl. ............... 340/407.1; 116/205; 345/173

(58) Field of Classification Search ............... 340/407.1; 73/865.7; 116/205; 345/173
See application file for complete search history.

(56) References Cited

U.S. PATENT DOCUMENTS

| | | | | |
|---|---|---|---|---|
| 5,583,478 | A * | 12/1996 | Renzi | 340/407.1 |
| 2009/0002328 | A1* | 1/2009 | Ullrich et al. | 345/173 |
| 2009/0250267 | A1* | 10/2009 | Heubel et al. | 178/18.03 |
| 2010/0177050 | A1* | 7/2010 | Heubel et al. | 345/173 |
| 2011/0107958 | A1* | 5/2011 | Pance et al. | 116/205 |
| 2012/0105333 | A1* | 5/2012 | Maschmeyer et al. | 345/173 |

* cited by examiner

*Primary Examiner* — John A Tweel, Jr.
(74) *Attorney, Agent, or Firm* — Camoriano & Associates

(57) ABSTRACT

A device and method are provided for creating a tactile picture by controlling gas flow through a plurality of through holes on a plate.

9 Claims, 4 Drawing Sheets

REFRESHABLE TACTILE MAPPING DEVICE

This application claims priority from U.S. Provisional Application Ser. No. 61/260,124 filed Nov. 11, 2009.

BACKGROUND

The present invention relates to a tactile device for communicating with and conveying information to visually impaired people. More particularly, it relates to a device to safely and conveniently create a refreshable, tactile "image" which can be sensed by the user.

Many blind people use Braille to read, and various other tactile devices are known for communicating with blind people, including devices that use vibrating motors, but there is a need for a device that can communicate sketches or shapes "on the fly" to a visually impaired person. The present invention arose out of a project in which blind people wanted to have a way to sense where they were and where they were going as they were travelling along the road in a car, but there is also a need for this type of communication in many other settings. For example, there is a need to communicate shapes "on the fly" in a classroom, when a teacher is drawing a sketch on the blackboard for the students. The ability to provide tactile pictures or images for blind people could also be used for entertainment and for other purposes.

SUMMARY

An embodiment of the present invention provides a device which uses a compressed gas, such as compressed air, to safely and conveniently create a refreshable, tactile "image." In one embodiment, the device includes a plate with a grid of orifices through which pressurized air flows, similar to the surface of an air hockey table. The air flow to each orifice is individually controlled. By activating the air flow in a specific pattern of orifices, and with each orifice functioning in a manner analogous to a pixel in a visual image, a tactile image can be created. A user (whether blind or sighted) can then hold his hand (or other sensitive part of his body) adjacent to the plate to feel a refreshable, tactile picture.

DESCRIPTION

Figure 1:
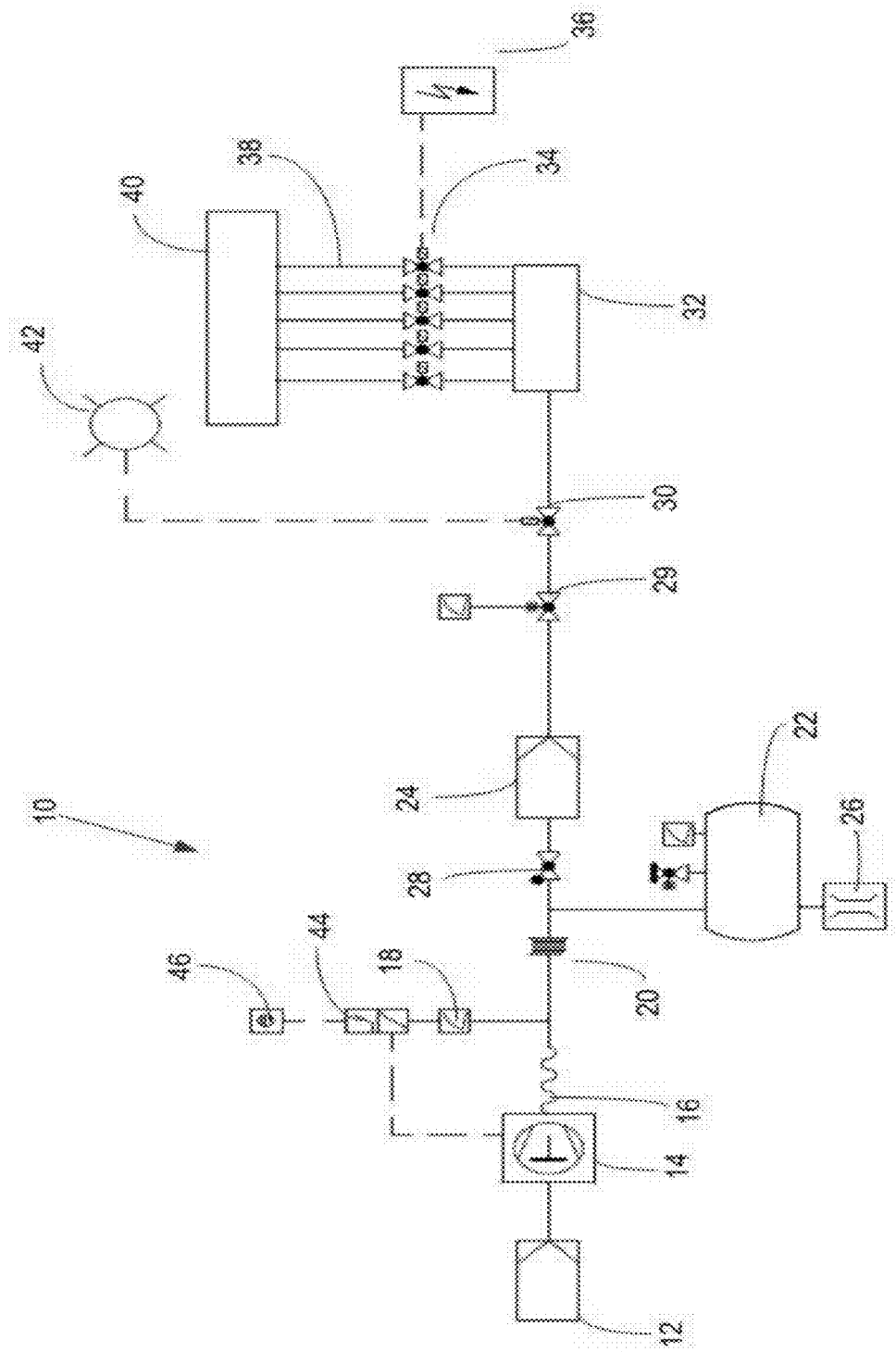
FIG. 1 is a schematic piping and instrumentation diagram of a refreshable tactile mapping device made in accordance with the present invention.

FIG. 1 is a schematic piping and instrumentation diagram for one embodiment of a refreshable tactile mapping device 10 made in accordance with the present invention. This particular embodiment uses compressed air, which is provided to the system by an air compressor 14.

Air at atmospheric pressure enters the system 10 and passes through an intake filter 12. In this particular embodiment, the filter 12 is a 10-micron filter 12, which removes debris to protect the air compressor 14 and the solenoid valves 30, 34. After the air passes through the filter 12, it goes to the air compressor 14, which, in this embodiment, is a single-stage reciprocating air compressor 14. The compressed air leaves the compressor 14 and then passes through a flexible hose 16, which serves as a vibration dampener, and then travels through finned tubing 20, which increases convection and improves heat transfer, effectively acting as an aftercooler for cooling the compressed air. A pressure gauge 18 senses the pressure of the air leaving the compressor 14. Once the compressed air passes through the finned tubing 20 and is cooled, it is then stored in the receiver 22, which is a pressurized container, or it passes through a desiccant type dryer 24 and then continues on to a manifold 32, and then through individual conduits 38 to the orifice plate 40. Each of the individual conduits 38 extends from the manifold 32 to one of the openings 48 (See FIG. 2) of the orifice plate 40. There is a solenoid valve 34 in each of the conduits 38 to control the flow of compressed gas to each of the openings 48.

The finned tubing 20 and receiver 22 allow water to be condensed out of the air and collected in the receiver 22 to minimize the load on the cartridge type replaceable desiccant dryer 24. The condensed water which collects in the receiver 22 is continuously dispelled through a ¹⁄₆₄"-diameter orifice 26 in the bottom of the receiver 22. When the air continues on from the receiver 22, it passes through a check valve 28 before reaching the desiccant-type dryer 24 which dries the air to protect the solenoid valves 30, 34 and other device components from condensation. The check valve 28 prevents the desiccant dryer 24 from continuing to absorb moisture from the ambient air which enters the system through the orifice 26 when the tactile mapping device 10 is not in use. Once dried, the air passes through a pressure regulator valve 29. This valve 29 can be adjusted to conveniently fine tune the final output pressure at the orifice plate 40 to a comfortable level for the user. After passing through the pressure regulator 29, the air passes through a solenoid valve 30 and then enters the manifold 32. The valve 30 which controls the flow of pressurized gas to the manifold 32 is opened by a switch 42, which may be a mechanical switch, a magnetic switch, a proximity switch, an infrared switch, a sound activated switch, or any other suitable switch.

A controller 36, such as a computer, sends signals to open and close the individual solenoid valves 34 to selectively route air through the individual conduits 38 to the individual openings in the orifice plate 40.

Figure 2:
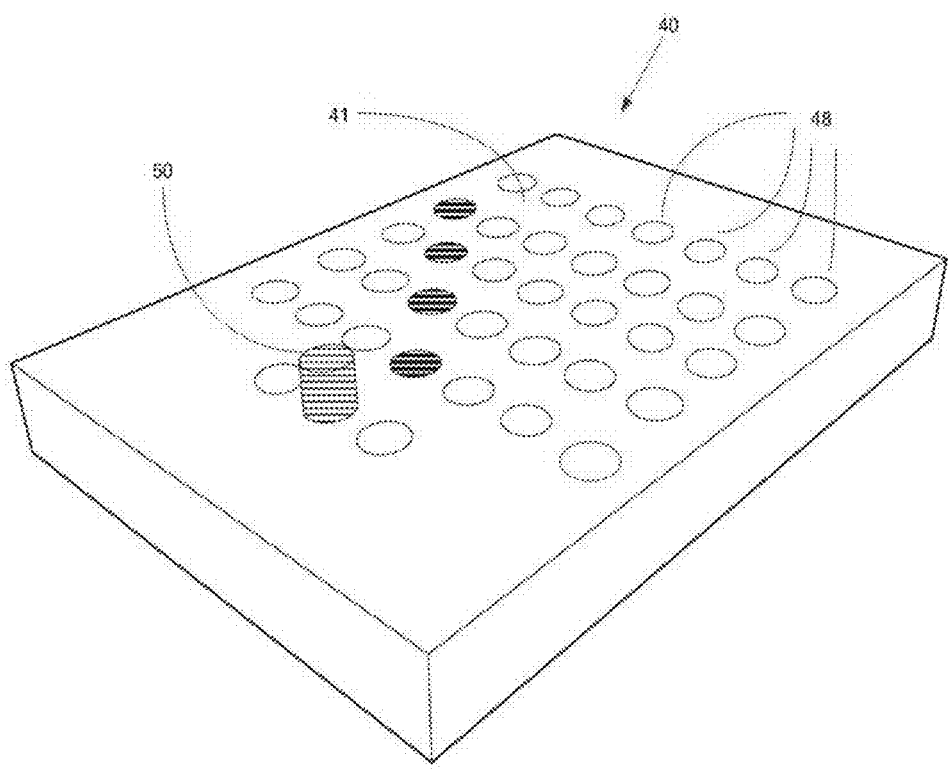
FIG. 2 is a perspective view of the grid of the refreshable tactile mapping device of FIG. 1.

FIG. 2 is a perspective view of the orifice plate 40 of the tactile mapping device 10. The orifice plate 40 is a body which defines a plurality of through openings 48. It is preferred that the orifice plate 40 have a planar surface 41, as shown here. The grid pattern formed by the openings 48 may be any desired pattern, but in this particular embodiment the openings or holes 48 are arranged in perpendicular columns and rows, forming a rectangular grid. Each opening 48 functions like a pixel in a black and white video image, either being "on", with air flowing through it, or "off", with air not flowing through it (or flowing at a much reduced rate so the person can feel the difference between "on" and "off"). It also would be possible to flutter the valve 34 to make a different type of tactile signal. The planar surface 41 is adjacent to an air space, into which the visually impaired person places his fingertips, hand, or other sensitive part of his body to "read" the tactile image generated by the pattern of air flowing through the selected openings.

In this embodiment, a reference point 50 is made on the planar surface 41 to give the visually impaired person a frame of reference with respect to the planar surface 41. The reference point may be a raised area, such as a peg, projecting upwardly from the planar surface 41, it may be a depression in the planar surface 41, or it may be a pulsed air stream or anything else that provides a tactile reference point that is different from the "on" and "off" air flows of the openings 48 that form the image.

Referring again to FIG. 1, each solenoid valve 34 is in communication with the controller 36 which controls the solenoid valves 34 to open and close the selected valves to form the air pattern that makes the tactile "image". The controller 36 may be pre-programmed to generate particular patterns of images, or it may generate patterns in response to a variable input. The variable input may be from one or more sensors that sense the environment around the visually impaired person, such as, but not limited to, radar, sonar, or laser measurements to a reflective surface, which would indicate the position of objects in the environment, and the controller would then generate a pattern of air flow that describes the location and size of those objects.

Figure 4:
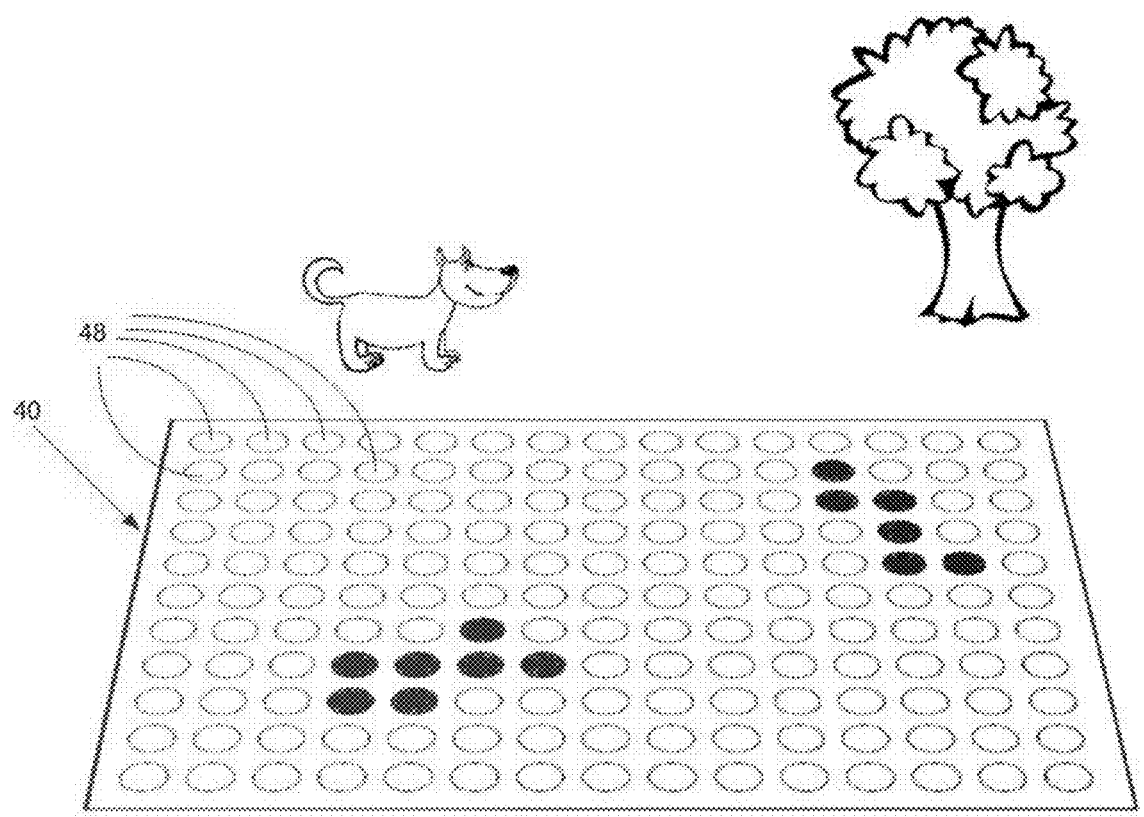
FIG. 4 is a schematic view of the mapping device being used to form an image of the surrounding environment.

FIG. 4 is a schematic showing the environment being sensed, which includes a dog and a tree, and the resulting output at the orifice plate 40. The openings 48 shown in black have air coming through them, while the other openings 48 do not. Obviously, in this embodiment, the resulting tactile image is a very rough representation of the dog and tree, essentially just letting the person know that there are objects in the environment and the relative sizes and locations of the objects. If the device were further refined to have more openings 48, a more detailed tactile image could be formed.

The variable input may be from a digital pad, which enables a person to manually draw a picture and generate signals that are sent to the controller 36, and the controller 36 then uses these signals to open and close the selected solenoid valves 34 to make gas flow through the selected openings 48 to generate a pattern that essentially reproduces the image that has been manually drawn. The variable input may be from another type of user-generated input, such as an optical scanner that scans an image, or a game controller or other user-generated electronic input, so the controller 36 generates a tactile image depending upon the input. The controller 36 may continuously change the image being generated or may "refresh" the image at fixed intervals, such as once per second, so the image may change or appear to "move" like a moving picture on a video screen.

Typically, the solenoid valves 34 are normally closed (power to open). The controller 36 energizes only selected valves 34 so as to open those selected valves 34 to allow pressurized gas to flow through the respective conduits 38 and out the respective openings 48 in the plate 40 to "draw" an image on the orifice plate 40. Of course, that could be inverted, with the default being for the valve to be open and with the solenoid being energized to close the valve. As was explained earlier, each opening 48 acts as a pixel or single point in an image, and may be "on" (with substantial air flow) or "off" (with little or no air flow) or fluttered, as mentioned earlier.

For instance, in FIG. 2, some of the openings 48 are shown in black to indicate that pressurized gas is flowing through them. In that case, the selected valves 34 corresponding to those blacked out openings 48 have been energized by the controller 36 to open those selected valves 34 and allow the pressurized air to flow through those openings 48.

The user places his fingertips or hand into the air space adjacent to the orifice plate 40 and senses the stream of air flowing out of the blacked out orifices 48. In the example shown in FIG. 2, the user reads the image of a straight line veering off toward the top left corner of the orifice plate 40.

In this embodiment 10, the reference point 50 is a stationary peg, which helps orient the user relative to the grid. Such a reference point is particularly useful in applications wherein the tactile mapping device 10 is used to provide positional data. The reference point 50 can indicate a "you are here" reference point for the user, or it may just provide a frame of reference for the images that are being generated, similar to a sighted person knowing what is the "top of the page" when looking at a printed image. The reference point 50 need not be a physical projection on the orifice grid 40. For instance, it could be generated by a rapidly pulsating stream of air or other pressurized gas emanating from one particular opening 48, which can be achieved by rapidly pulsing the corresponding valve 34 on and off. Of course, for many purposes, the reference point would not be needed.

The controller 36 may pulse the air flow through any of the openings 48 to provide a different type of output signal that can be read by the visually impaired person, and the frequency of on and off pulsation can be adjusted to indicate yet another output option. For instance, a slowly pulsing opening may indicate a green light condition for a street light. Faster pulsing of the opening may indicate a yellow light, and very fast pulsing could indicate a red light.

The operation of the tactile mapping device 10 is straightforward. If, for instance, the tactile mapping device 10 is installed in a vehicle driven by a visually challenged person, when the vehicle's electrical systems are started, the compressor 14 begins to operate and fill the receiver 22. When the user wants to receive tactile input, he simply places his hand adjacent to the orifice plate 40 at a comfortable position, breaking the plane of the switch 42 (which may be a light sensor 42) which opens the valve 29 and allows air to flow to the orifice plate 40. Alternatively, the switch 42 may signal the controller 36, which then may open the valve 29. If the user is idling at a stop light, for example, he can remove his hand from the orifice plate 40. The sensor 42 will indicate that the orifice plate 40 is not being used, and will close the valve 29, reducing the duty cycle of the compressor 14.

Should there be a failure in the compressor 14, it will be detected by a pressure switch 44, and an audible alarm 46 will sound, indicating that the user will lose tactile directional input from the tactile mapping device 10, and giving the user a short period of time before the device stops working, as the remaining air in the system is used. The air receiver's volume preferably is sized to allow a reasonable amount of time for the air supply to remain after the compressor 14 stops. In a preferred embodiment, the receiver 22 provides at least 30 seconds of usable air supply after a compressor 14 shutdown.

Figure 3:
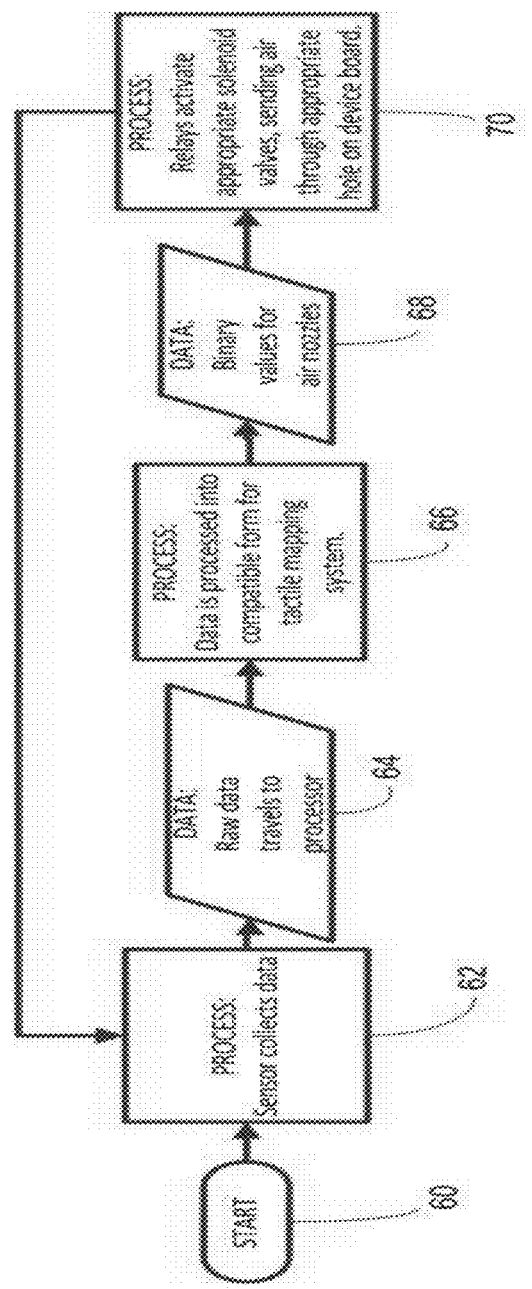
FIG. 3 is a process schematic for the refreshable tactile mapping device of FIG. 1.

FIG. 3 shows an example of a process control flow diagram for the tactile mapping device 10 of FIG. 1. First, the entire process is initialized using a start button 60. Then, in the first process block 62, some type of variable input is provided to be used to generate an image. When the device 10 is used to provide a refreshable map for a person riding in a vehicle, this process block 62 represents the data being acquired by laser range finders or other environmental sensors (such as, but not limited to, sonar readings, radar readings, and/or GPS data) around the vehicle. If the device is being used in a classroom, this process block may represent signals generated by the teacher drawing a sketch onto a digital tablet or signals generated by a digital scanner scanning a printed image. Alternatively, this block may represent other types of variable input from other sources, such as a game controller.

In the next process step 64, this data then travels to the processor 36 (See FIG. 1), which is a computer or other electronic controller which processes the data in process step 66, such as by using algorithms to generate signals in process step 68 which are sent to the selected solenoid valves 34 (process step 70) to generate a tactile image. That is, it determines the timing and placement of air through the openings 48 necessary to portray the desired image, and generates the control signals to control the solenoid valves 34 to generate the appropriate image. This process is iterative, so the image is regularly refreshed and may change, such as when the vehicle moves down the road and the surroundings change or when the teacher adds more to the sketch, or when a character in a video game moves. For different applications, different iterating speeds may be desirable. Iteration at frequent intervals refreshes the tactile image, thereby enabling the formation of a moving tactile image.

The electronic controller 36 also may be provided with a predetermined set of commands to produce a predetermined set of tactile images, such as a triangular shape, letters of the alphabet, numbers, the outline of an animal shape, and so forth.

The electronic controller 36 also may receive data from a Global Positioning System (GPS) in the process step 62 and may correlate that data with stored maps to generate an image of a road or of several roads or to generate an image of stored data corresponding to landmarks or other fixtures located in the area.

Additional variable inputs corresponding to physical features sensed in the real life environment (such as a car or a person on the roadway ahead of the vehicle) are communicated to the electronic controller 36 which then automatically generates signals to open and close valves 34 to form a tactile image on the orifice plate 40 representing the sensed environment as well as the stored data of fixed elements in the environment such as roads and landmarks corresponding to the position sensed from the GPS satellite. This allows the device 10 to provide a complete picture to the traveler, illustrating the route, the permanent features on the route, and any changing physical features along the desired route, and this is done in real time, so the traveler has a good sense of the environment around him as he is riding down the road in a vehicle.

It will be obvious to those skilled in the art that modifications may be made to the embodiments described above without departing from the scope of the present invention.

What is claimed is:

1. A method for providing tactile information to a blind or visually impaired or other person, comprising the steps of:
   providing at least one source of pressurized gas;
   providing a plate having a surface defining a plurality of openings which open into an airspace directly adjacent to the openings;
   providing a plurality of conduits, each of said conduits being in fluid communication with said source of pressurized gas and with a respective one of the openings;
   providing a valve for each of said conduits, each of said valves including means for opening and closing fluid communication through the respective conduit; and
   using an automated electronic controller to selectively open and close the valves to allow pressurized gas to flow from the pressurized gas source through selected openings and into the airspace directly adjacent to the openings to form a tactile image that can be read by placing the fingertips or other sensitive part of the body of the person into the airspace adjacent to the surface of the plate.

2. A method for providing tactile information as recited in claim 1, and further comprising the step of adjusting the pressure of the gas source so the pressurized gas coming out of the openings in the plate is comfortable for the user.

3. A method for providing tactile information as recited in claim 2, and further comprising the step of selectively changing the positions of the valves at frequent intervals to refresh the tactile image.

4. A method for providing tactile information as recited in claim 2, and further comprising the step of providing the electronic controller with a prepared set of commands to produce a predetermined set of tactile images.

5. A method for providing tactile information as recited in claim 2, and further comprising the steps of providing a variable input to the automated electronic controller and generating commands from the controller to open and close the valves in response to the variable input.

6. A method for providing tactile information as recited in claim 5, wherein the step of providing a variable input includes using an electronic drawing device to draw an image by hand and generating electronic signals in response to the hand drawing.

7. A method for providing tactile information as recited in claim 5, wherein the step of providing a variable input includes sensing physical features in the real life environment and automatically generating electronic data corresponding to the physical features.

8. A method for providing tactile information as recited in claim 7, wherein the sensing includes using at least one of the mechanisms consisting of optical sensors, sonar, radar, and laser distance measurement devices.

9. A method for providing tactile information as recited in claim 7, and further comprising the steps of correlating the information about the physical features being sensed with data from a global positioning system and generating a tactile image that includes both representations of permanent physical features that are stored by the device corresponding to the position and physical features that are sensed.

* * * * *